Sept. 9, 1930.   J. C. BERGNER   1,775,617
ALIMENT FORMING DEVICE
Filed June 16, 1928   2 Sheets-Sheet 1
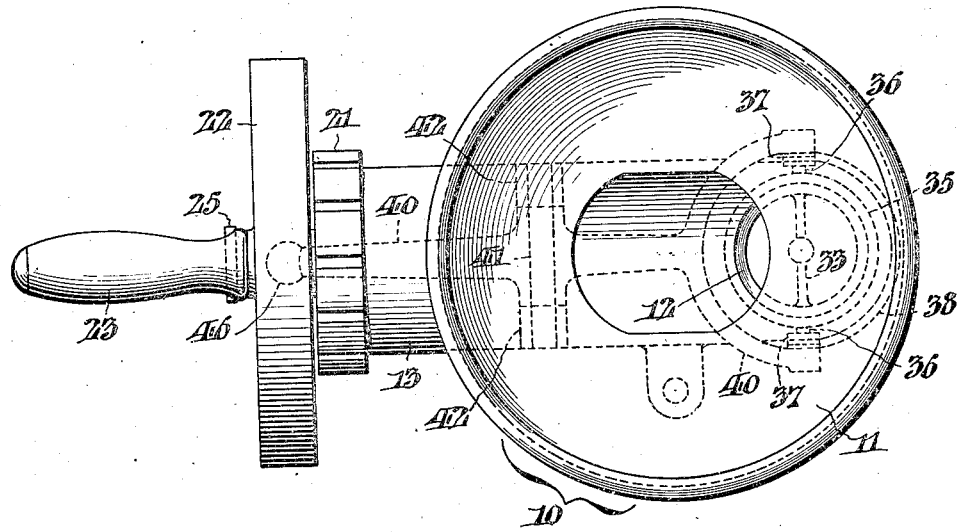
FIG. I.
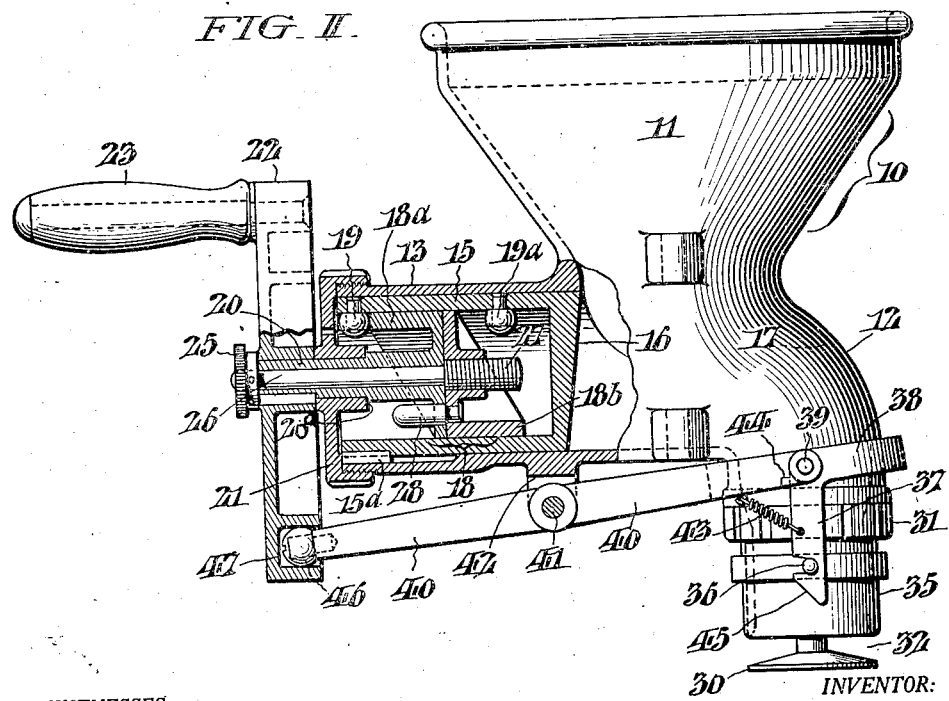
FIG. II.
WITNESSES
INVENTOR:
John C. Bergner,
BY
ATTORNEYS.

Sept. 9, 1930.  J. C. BERGNER  1,775,617
ALIMENT FORMING DEVICE
Filed June 16, 1928   2 Sheets-Sheet 2
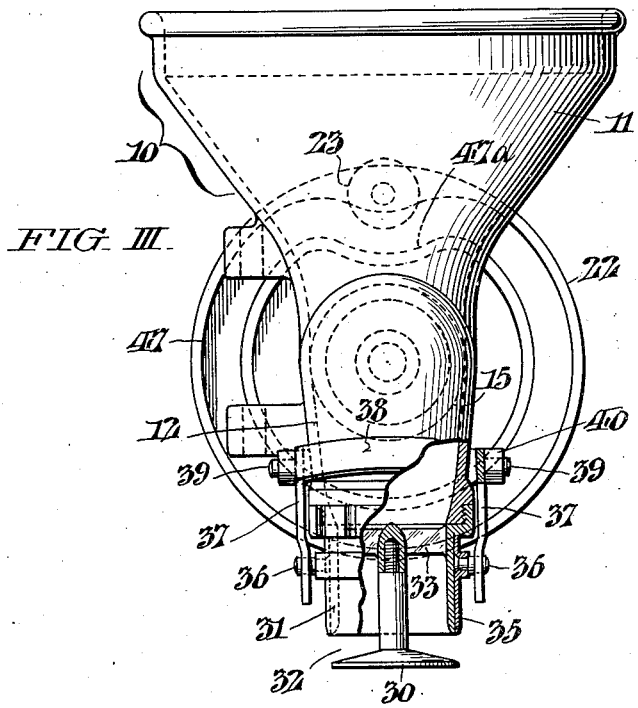
FIG. III.
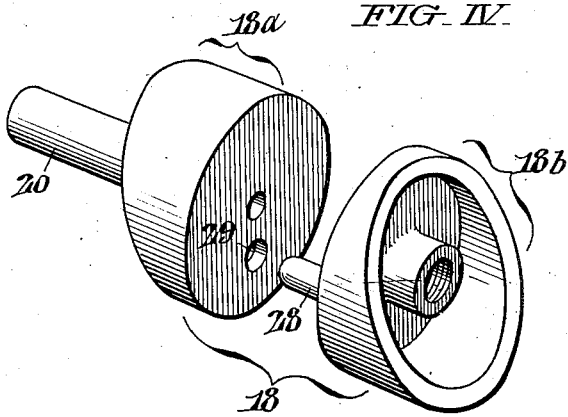
FIG. IV.
WITNESSES
INVENTOR:
John C. Bergner,
BY
ATTORNEYS.

Patented Sept. 9, 1930

1,775,617

UNITED STATES PATENT OFFICE

JOHN C. BERGNER, OF LANSDOWNE, PENNSYLVANIA, ASSIGNOR TO DOUGHNUT MACHINE CORPORATION, OF NEW YORK, N. Y., A CORPORATION OF NEW YORK

ALIMENT-FORMING DEVICE

Application filed June 16, 1928. Serial No. 285,868.

This invention relates to devices for forming alimentary products from plastic material, for example: doughnuts or crullers from prepared dough.

The chief objects of my invention are to enable formation of products of the kind referred to with assurance of uniformity as regards size, shape and quality, in rapid succession and under absolutely sanitary conditions; and to provide a very simple, reliable and inexpensive mechanism by aid of which the indicated ends are attained.

A further object of my invention is to provide in connection with mechanism having the above attributes, for regulation whereby the size of the formations may be changed at will, as well as for ready dismantling of the parts directly concerned in the manipulation and cutting of the plastic so that they may be easily inspected and cleaned and again restored without disturbance of their adjustment and timing.

Still other objects and attendant advantages will be manifest from the following detailed description of the typical embodiment of this invention shown in the drawings whereof Fig. I is a plan view of my improved forming device.

Fig. II is a side elevation of the same with a portion broken out and in section to expose important structural features.

Fig. III is an elevation of the device viewed from the right hand end of Fig. II, also with a portion broken away and in section; and Fig. IV is a perspective view of the parts constituting the rotary actuating means for the element by which unit portions of the plastic are displaced.

With more detailed reference to these illustrations 10 designates the casing of the device, the same affording a hopper 11 which is appropriately configured around its top for superimposition and retainment of a storage magazine (not shown) for the dough. From Fig. II it will be observed that the hopper 11 discharges downwardly through an axially offset outlet 12. Within a cylindric chamber 13 afforded by the casing 10 between the hopper 11 and the outlet 12, operates a laterally reciprocating plunger 15, held against rotation by a key $15^a$, said plunger having its inner face 16 sloped somewhat to the vertical for capacity to cooperate with a counter slope of the opposite wall of the casing 10 at 17 in insuring at each actuation, downward displacement of unit portions of the dough into the outlet 12. The piston 15 is made hollow to accommodate a rotary actuating means here shown as a double acting cam 18 embodying two companion sections $18^a$, $18^b$ capable of relative adjustment to vary the throw of the plunger as hereinafter more fully explained. The actuating cam 18 engages between two longitudinally spaced inward projections of the plunger 15 having, in the present instance, the form of anti-friction rollers 19, $19^a$. The section $18^a$ of the cam has an integral axial cylindric prolongation 20 which serves as a drive shaft therefor, said prolongation projecting through an axial bearing boss of a screw cap 21 forming the outer wall of the chamber 13. To the posterior end of the axial shaft prolongation 20 of the cam section 18 is keyed a drive disk 22 provided with a hand grasp 23 for manual operation. If desired the device may be adapted for power operation by employing the disk 22 either as a pulley, or by forming the same as a gear. The cam section $18^a$ is held against axial shifting through engagement of a shoulder $20^a$ on its shaft extension 20 with the in-side of the central bearing of the screw cap 21 on the one hand, and on the other hand through abutment of a thumb knob 25 at the outer end of a regulating stem 26, with the outer face of the drive disk 22. The regulating stem 26 extends axially inward through the shaft prolongation 20, and terminates in a diametrically enlarged threaded portion 27 for engaging an internally threaded boss of the cam section $18^b$ which is shiftable axially relative to the section $18^a$ but held against turning through traverse of a stud 28 in an opening 29 of said section $18^a$. With the described arrangement it will be seen that, by turning the thumb knob 25, the cam sections $18^a$, $18^b$ can be spaced to different extents thereby increasing or decreasing the width of the cam 18. This results in varying the clearance or play between the inclined cam edge of the section 18ᵇ and the roller 19ᵃ with which it cooperates whereby the inward movement of the plunger is correspondingly altered to vary the unit quantities displaced through the outlet 12 from the hopper 11 by the plunger. It is however important to observe that as a consequence of the immobility of the section 18ᵃ as regards longitudinal shifting, the outer limit of movement of the plunger 15 remains unchanged with avoidance normally of obstruction to the flow of the dough from the hopper 11 into the province of said plunger.

A disk 30 vertically spaced from the lower edge of a removable extension piece 31 of the outlet 12, constitutes jointly with the latter, an annular die opening 32 for extrusion of the dough, said disk being suspended axially from a bridge bar 33 internally of said outlet, see Figs. I and III. A cutter sleeve 35 slidable on the extension 31 cooperates, by shearing action over the edge of the disk 30, to sever annular formations of the plastic extruded through the die opening 32. The cutter sleeve 35 has laterally extending projections 36 adapted to be engaged by downward hook extremities 37 of a yoke piece 38 pivoted at 39, 39 to an operating member in the form of a clevised rocker arm 40 having fulcrum support on an axis 41 engaged in lugs 42 of the hopper casing 10. The hook extremities 37 are normally held in engagement with the projections 36 by tension springs 43. This construction permits the yoke 38 to be retractively swung against the pull of the springs 43 to disengage the projections 36 and permit removal of the cutter sleeve 35 from the outlet extension 31 for cleaning or inspection. The inward swing of the yoke 38 is limited as shown by stop lugs 44 on the arm 40; and the hook extremities are beveled at their lower ends as indicated at 45. Accordingly as the sleeve 35 is moved upwardly on the outlet extension 31 incidentally to re-assembling, the yoke 38 is automatically deflected for passage of the lugs 36 into the notches of the hooked extremities 37. A roller 46 at the opposite end of the rocker arm 40 engages an open cam groove 47 in the inner face of the drive disk 22, said cam groove being diverted inwardly at 47ᵃ (Fig. III) so as to be effective in causing quick down and up movement of the cutter sleeve 35 to sever the extrusions in alternation with the active strokes of the piston 15, that is to say, while the plunger executes its rearward strokes.

From the foregoing it will be seen that my improved forming device is extremely simple and compact in construction and therefore free from the possibility of easy derangement. It is moreover easily kept clean, the cutter sleeve 35 being withdrawable for the purpose as already explained, and the displacing piston 15 together with its actuating instrumentalities i. e., the rotary cam 18, and the drive disk 22, removable as a unit with the screw cap 21 from the hopper structure 10—said drive disk 22 slipping readily away from the ball tipped end of the cutter sleeve operating arm 40 without requiring dismantling of the latter or changing its position. It is also noteworthy that the entire cleaning operation, as well as subsequent reassembling of the parts, can be accomplished without disturbing the adjustment of the piston actuating cam 18.

Having thus described my invention, I claim:

1. A forming device of the character described comprising a hopper with a continuously-communicating discharge outlet for plastic material, an intermediary reciprocating plunger for displacing the plastic from the hopper through the outlet, and rotary actuating means coaxial with the plunger.

2. A forming device of the character described comprising a hopper with a continuously-communicating discharge outlet for plastic material, an intermediary reciprocating plunger for displacing the plastic from the hopper through the outlet, and a rotary actuating cam coaxial with said plunger.

3. A forming device of the character described comprising a hopper with a continuously communicating discharge outlet for plastic material, an intermediary reciprocating plunger for displacing the plastic from the hopper through the outlet, and a rotary actuating cam operating within a hollow of the plunger.

4. A forming device of the character described comprising a hopper with a continuously communicating discharge outlet for plastic material, an intermediary reciprocating plunger for displacing unit portions of the plastic from the hopper through the outlet, and rotary actuating means within a hollow of the plunger capable of regulation from the exterior of the device to vary the throw of said plunger and the quantity in the unit portions of the plastic.

5. A forming device of the character described comprising a hopper for plastic material discharging through a continuously-communicating downward outlet, a laterally reciprocating plunger operating intermediate the hopper and the outlet, and regulatable actuating means within a hollow of the plunger whereby the throw of the latter may be varied relative to a fixed outer limit of plunger movement to correspondingly vary unit quantities of the plastic displaced without normally obstructing flow of the plastic from the hopper into the province of the plunger.

6. A forming device of the character described comprising a hopper for plastic material discharging through a downward outlet, a laterally reciprocating hollow plunger operating in a chamber intermediate the hopper and the outlet, a double acting rotary actuating cam within the hollow of the plunger adapted to engage between spaced projections of the latter, a driving shaft for the cam extending to the exterior through the end wall of the chamber, and regulating means extending axially through the drive shaft for adjusting a movable section of the actuating cam for the purpose of varying the throw of the plunger and the unit portions of the plastic displaced from the hopper.

7. A forming device of the character described comprising a hopper for plastic material discharging through a downward outlet, a laterally reciprocating hollow plunger operating in a chamber intermediate the hopper and the outlet, a double acting rotary actuating cam within the hollow of the plunger adapted to engage between spaced projections of the latter, a driving shaft for the cam extending to the exterior through the end wall of the chamber, and a regulating stem accessible from the exterior to adjust a movable section of the actuating cam for the purpose of varying the throw of the plunger and the unit portions of the plastic displaced thereby, said stem extending axially through the drive shaft aforesaid and having a threaded connection with the movable cam section.

8. A forming device of the character described comprising a hopper with a forming die outlet for plastic material, an intermediary reciprocating plunger for displacing unit portions of the plastic from the hopper through said die outlet, rotary actuating means within a hollow of the plunger, cutting means for severing the formations extruded through said die outlet, and means coordinating said cutting means with the rotary actuating means of the plunger for intermittent operation in alternation with the active strokes of said plunger.

9. A forming device of the character described comprising a hopper with an outlet discharging through an annular die opening, a reciprocating plunger for displacing unit portions of plastic through the annular die opening, rotary actuating means coaxial with the plunger including a drive disk, a cutter sleeve slidable on the hopper outlet to sever extrusions of the plastic through the die opening, and an operating member with a roller running in a face cam groove of the drive disk aforesaid for actuating the cutting means intermittently in alternation with the active strokes of the displacing plunger.

10. A forming device of the character described comprising a hopper for plastic material having an outlet discharging through an annular die opening, a hollow reciprocating plunger operating in a chamber intermediate the hopper and the outlet, rotary actuating means located within the hollow of the plunger having a drive shaft extending to the exterior through a cap closing the end of the plunger chamber, a driving disk secured to the posterior portion of said driving shaft, cutting means to sever extrusions through the die opening aforesaid, and an operating member for actuating the cutting means having a roller running in an open cam groove in one face of the drive disk, the plunger, its actuating means and the drive disk being removable as a unit with the closure cap aforesaid without necessity for disturbing the operating member of the cutting means.

11. A forming device of the character described comprising a hopper for plastic material having an outlet discharging through an annular die opening, means for displacing unit portions of the plastic through the annular die opening, a cutter sleeve slidable on the outlet across the die opening to sever the unit extrusions of the plastic, an operating member with a clevis to space the cutter sleeve, and a yoke piece having hook extremities to engage lugs projecting from opposite sides of the cutter sleeve, said yoke piece being pivotally connected to the clevis ends of the actuating member for retractive swinging movement to release the sleeve and permit its removal from the outlet aforesaid.

In testimony whereof, I have hereunto signed my name at Philadelphia, Pennsylvania, this 14th day of June, 1928.

JOHN C. BERGNER.